UNITED STATES PATENT OFFICE.

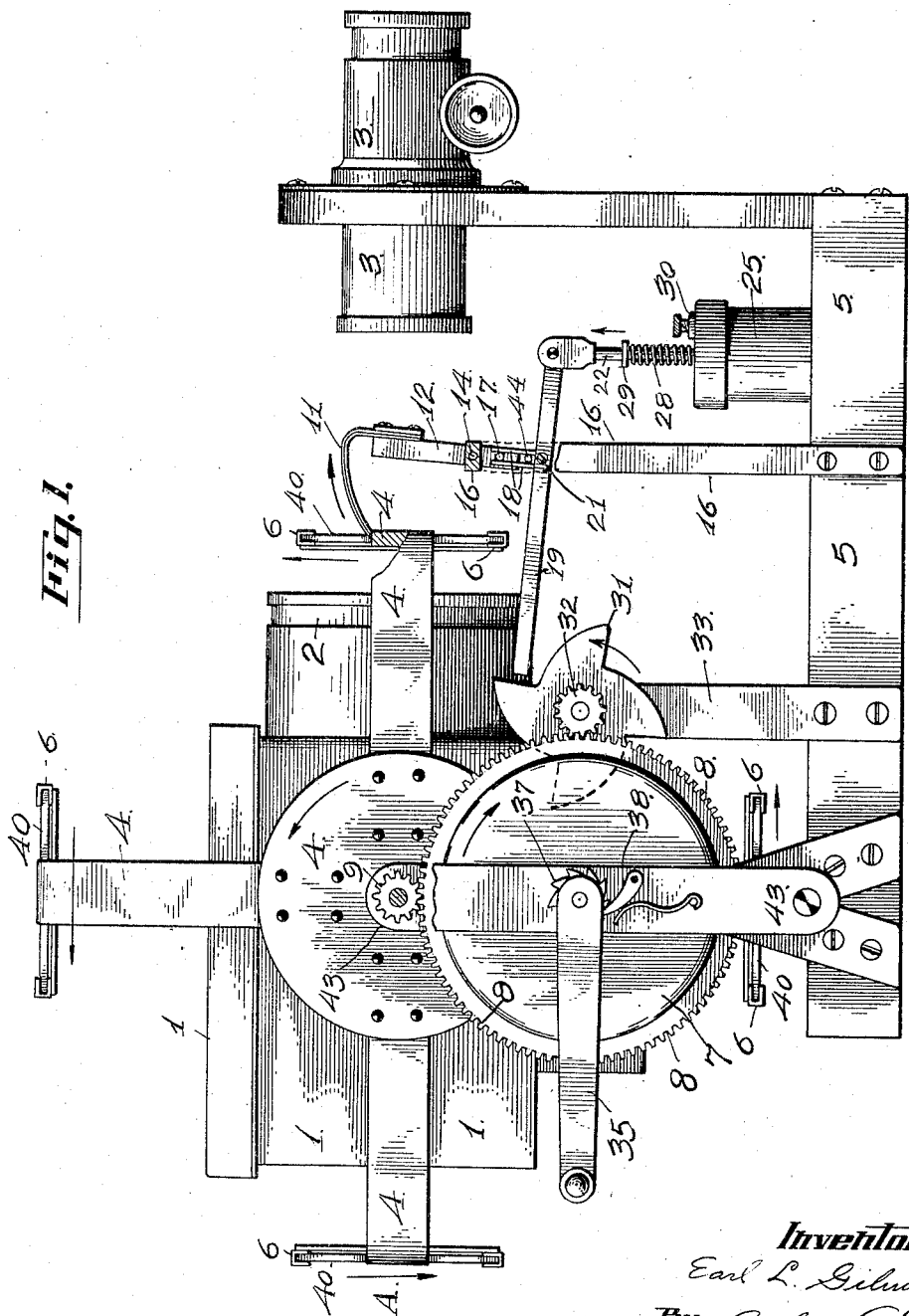

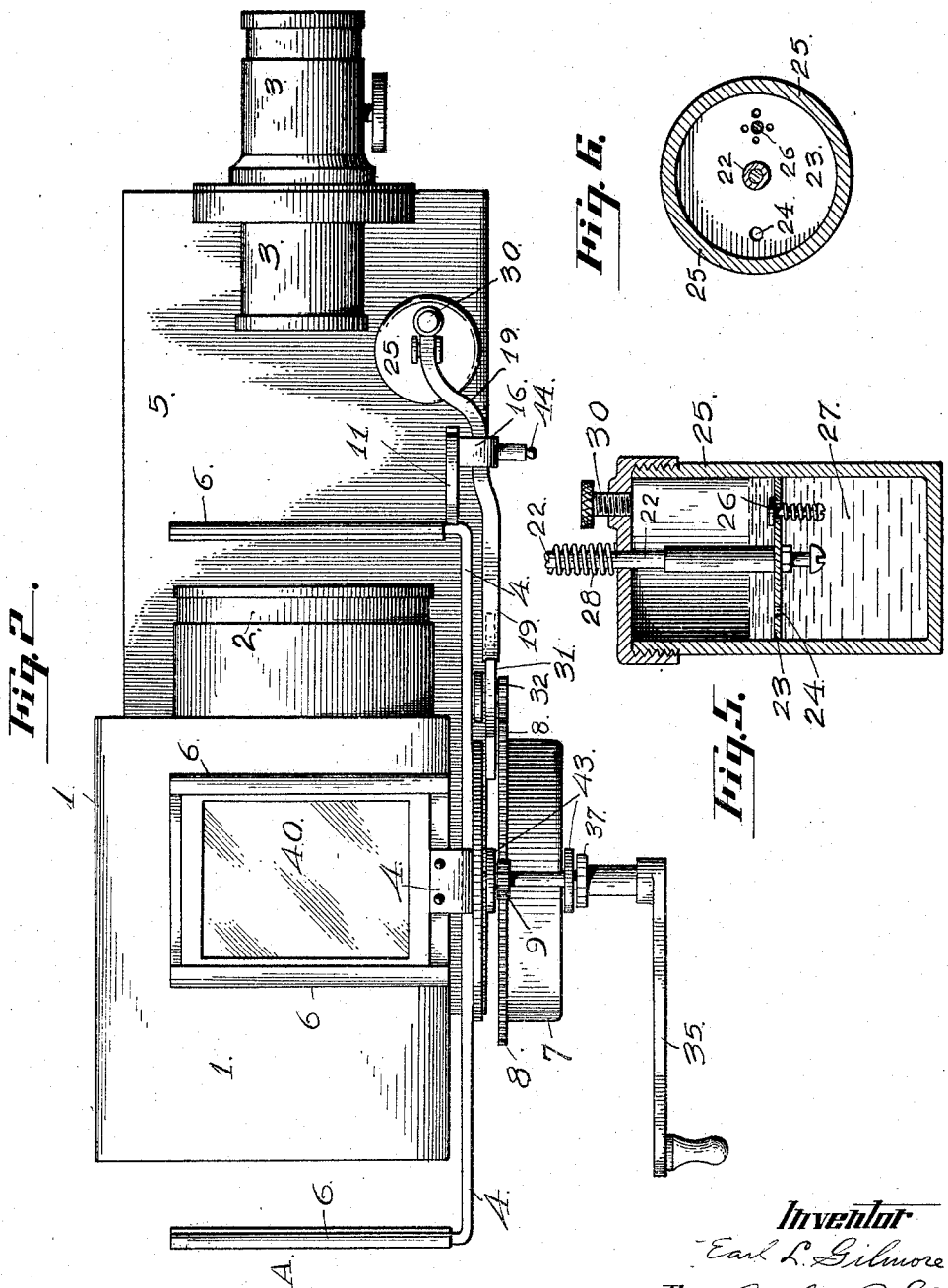

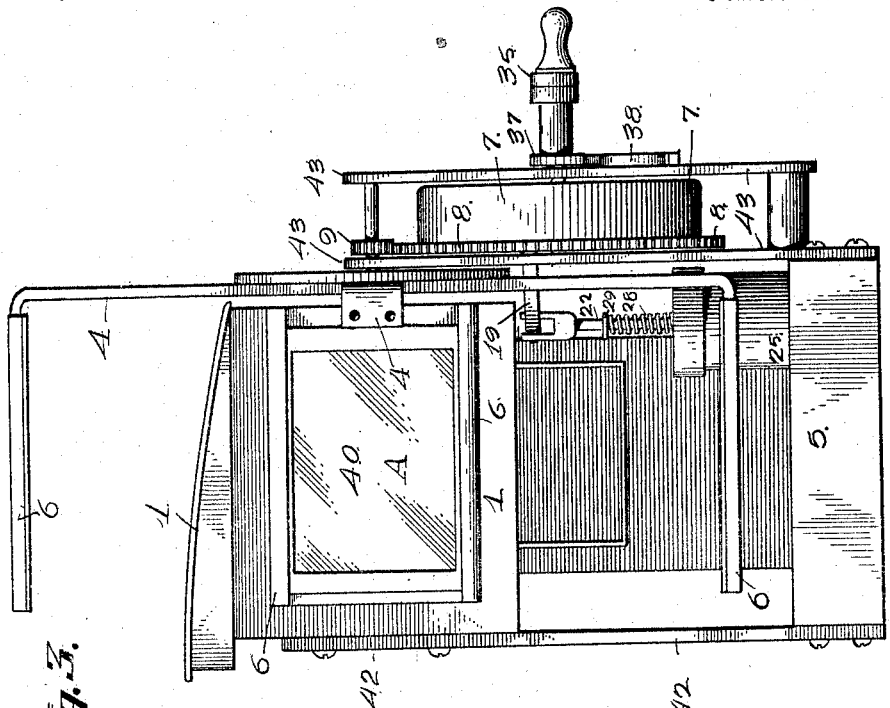

EARL L. GILMORE, OF SAN FRANCISCO, CALIFORNIA, ASSIGNOR TO VITASLIDE COMPANY, OF SAN FRANCISCO, CALIFORNIA, A FIRM.

PROJECTOR.

1,303,193.     Specification of Letters Patent.    Patented May 6, 1919.

Application filed March 21, 1917. Serial No. 156,478.

*To all whom it may concern:*

Be it known that I, EARL L. GILMORE, a citizen of the United States, residing in the city and county of San Francisco and State of California, have invented a new and useful Improvement in Projectors, of which the following is a specification.

My invention relates to improvements in projectors wherein a slide-carrying rotating element operates in conjunction with controlling means therefor to project successive slides of the type and character disclosed in the two patents issued to me on the 6th day of January, 1914, and the 13th day of October, 1914, said Letters Patent being numbered 1,083,679 and 1,113,610 respectively, reference to which patents is hereby made; and the objects of my invention are—

First, to provide an improved intermittent projector adapted to project successive slides of the character referred to in the above mentioned patents;

Second, to provide an improved projector of cheap and simple construction, having few parts and a maximum efficiency;

Third, to provide a simple and improved projector adapted to operate the motion slides referred to;

Fourth, to provide an improved device of the character described having a simple and effective controlling means to temporarily arrest successive motion slides between a projecting lens and condenser whereby said motion slides may be operated and projected;

Fifth, to provide a slide-carrying element adapted to rotate the motion slides referred to around the lantern in a vertical plane to temporarily arrest one slide in alinement with the projecting means and a diametrically opposed slide in a reversed position to return the sliding or movable member therein to a normal position.

I accomplish these several objects by means of the preferred form of the device disclosed in the drawings forming a part of the present specification, wherein like characters of reference are used to designate similar parts throughout the said specification and drawings, and in which—

Figure 1 is a side elevation of the projector disclosing the arresting latch about to be released from the rotating slide-carrying spider.

Fig. 2 is a plan view of the projector disclosing the manner in which the slide holders are rotated around the lantern in a vertical plane and between the condensing lens and objective lens.

Fig. 3 is a rear elevation of the projector further disclosing the arrangement whereby motion slides are rotated around the lantern in a vertical plane.

Fig. 4 is a broken detailed view of the controlling mechanism whereby successive motion slides are temporarily arrested in alinement with the condensing lens and objective lens, the several parts being shown in the opposite extreme position from that shown in Fig. 1.

Fig. 5 is a vertical sectional view of the fluid dash-pot or latch retarding mechanism.

Fig. 6 is a transverse sectional view of the dash-pot disclosing the piston in plan view, the relief valve being removed; and Fig. 7 is a broken side elevation of the latch disclosing the manner in which the same is pivotally mounted upon its standard or pedestal.

This projector is designed to project and operate motion slides comprising hollow transparent members having a portion of the design to be projected, impressed or otherwise printed upon a movable member immersed within a viscous transparent fluid to retard the action of gravity upon the movable member which movement, when reversed upon the screen through a condenser, will appear to be a gradual upward movement. Before projecting, these motion slides must be reversed or turned upside down for a period in order to permit gravity to move the movable member as more fully disclosed in the above mentioned patents.

Referring to the drawings, the numeral 1 is used to designate a suitable lantern having a condensing lens within a suitable housing 2 and an objective lens 3 alined therewith. A rotating spider 4 is mounted upon a suitable frame or base 5 and has laterally extending slide holders 6 arranged to be rotated around the lantern 1 in a vertical plane and between the objective lens and the condenser 2.

The spider 4 is arranged to be normally rotated by means of a suitable spring drum 7 having a gear 8 meshing with a pinion 9 secured to the spider 4.

An arcuate spring latch 11 is secured to a member 12 pivotally mounted as at 14 to a standard 16 secured to the base or frame 5. The lower end of the member 12 is provided with a pin 17 engaged by parallel members 18 mounted upon the top of bar 19 also pivotally mounted upon the standard 16 as at 21.

One end of the bar 19 is operatively connected to the stem 22 of a piston 23 having an aperture 24 therein, the purpose of which will hereinafter be more fully set forth, and slidably mounted within a fluid dash-pot 25 filled with a non-volatile liquid, preferably an oil.

The piston 23 is also provided with a relief valve 26 to permit the passage of the fluid 27 in one direction only. A spring 28 is interposed between a collar 29 on the piston stem 22 and the top of the dash-pot 25 to normally move the piston 23 upward and cause the passage of the oil 27 from above the piston 23 through the aperture 24 therein and below said piston 23 to the lower portion of the said dash-pot 25, the purpose of which retarding mechanism will hereinafter be more fully set forth. The dash-pot 25 is provided with a suitable filler cap 30.

The opposite end of the rod or bar 19 is arranged within the path of a star cam 31 having a gear 32 meshing with the gear 8 of the rotating mechanism or drum 7, said cam 31 and gear 32 being rotatably mounted upon a suitable standard 33 secured to the base or frame 5.

A suitable handle 35 and retaining ratchet 37 operate in conjunction with a spring controlled pawl 38 to wind and retain the tension of the spring drum 7 to normally rotate the spider 4.

The motion slides 40 are mounted within the slide holders 6.

A standard 42 is secured to one side of the base 5 to support the lantern 1 while suitable standards 43 are secured to the opposite side of the said frame 5 to support the rotating spider 4 and rotating mechanism therefor whereby said spider 4 and the slides 40 therein may be rotated around the said housing 1 in a vertical plane and between the objective lens 3 and the condenser 2 alined therewith.

A suitable spring controlled arcuate retaining latch 44 is mounted upon the standard 16 and arranged to prevent the operation of the projector when released as disclosed in Fig. 7 of the drawings.

The operation is as follows:

The motion slides 40 are placed within the holders 6 so as to be in a reversed or upside down position when brought between the objective lens 3 and the condenser 2.

The rotating mechanism consisting of the spring drum 7, gear 8 and pinion 9 will normally tend to rotate the spider 4 in the direction indicated by the curved arrow in Fig. 1 of the drawings.

But such rotation is arrested by the arcuate latch 11.

The latch 11 is moved to release the spider 4 by the tension of the spring 28 which tends to move the piston stem 22 upwardly and thereby operate the bar 19 and pin 18 thereon to engage the pin 17 of the member 12 and move the latch 11 away from the spider 4. But such movement is retarded by the fluid 27 within the dash-pot 25 as said fluid must pass through the comparatively small aperture 24 within the piston 23 before said piston 23 can move upwardly a sufficient distance to permit the releasing of the latch 11. The latch 11 is curved with the pivotal point 14 as a center in order that said latch may be withdrawn without permitting an upward movement of that portion of the spider 4 which would tend to destroy the alinement of the slide 40 with the objective lens 3 and condenser 2.

As soon as the spider 4 is released by the latch 11 the drum 7 rotates said spider 4 and also the pinion 32 and cam 31 secured thereto which cam 31 engages and tilts the bar 19 to move the piston 23 downward and thereby re-set the retarding mechanism consisting of the dash-pot 25 and piston 23 thereon.

The piston 23 may be moved downwardly quickly to return the latch 11 into the path of the spider 4 for the reason that in addition to the aperture 24 the valve 26 is provided to permit the passage of fluid 27 from below to above the piston 23. As soon as said downward movement of the piston 23 is accomplished the valve 26 is closed and the fluid or oil 27 may only return through the aperture 24 thereby retarding the upward movement of the said piston 23 to release the latch 11.

It is obvious from the foregoing that as soon as the latch 11 releases the spider 4 the said spider 4 will rotate and the cam 31 will operate to return said latch 11 into the path of the spider 4 and thereby temporarily arrest successive slides between the objective lens 3 and in alinement with the condenser 2.

It is also evident that the intermittent rotation of the spider 4 carries the slides 40 around the lantern 1 in a vertical plane so that said slides will be held reversed for a period when reaching the position A in the rear of the lantern 1. This rotation in a vertical plane is important and necessary in this type of projector as it is desired to reverse the slides 40 for a period after leaving the projecting position in order that the movable member therein may be again reversed by gravity to return the said slidable member therein to a normal position.

It is also obvious that I have provided an improved projector adapted to temporarily arrest successive motion slides of the character referred to between the objective lens and condensing lens as well as means for arresting the said slides in a reversed position for a sufficient period to return the movable member therein to a normal position.

Having thus described my invention what I claim as new and desire to secure by Letters Patent is—

1. A projector comprising a lantern having a suitable condensing lens; an objective lens alined with the condensing lens; a slide-carrying element arranged to rotate slides around the lantern in a vertical plane and between the lenses; means for normally rotating the slide-carrying element; an arcuate latch arranged to engage the slide-carrying element and to arrest successive slides between the lenses; a spring arranged to normally release the latch; a fluid dash-pot operatively connected to the latch and arranged to retard the release thereof; and means operatively connected to the rotating means to re-set the dash-pot and move the latch into the path of the slide-carrying element when said element is rotated after being released whereby successive slides may be temporarily arrested between the lenses.

2. A projector comprising a lantern having a suitable condensing lens; an objective lens alined with the condensing lens; a spider having slide holders thereon arranged to rotate said slide holders around the lantern and between the lenses in a vertical plane whereby said slides may be reversed during each rotation; means for normally rotating the spider; a latch arranged to engage successive arms of the spider and temporarily retain successive slide holders thereon between the lenses; a spring to normally release the latch; a fluid dash-pot operatively connected to the latch to retard the release thereof; and a cam operatively connected to the rotating means and the dash-pot and arranged to re-set the said dash-pot and to return the latch into the path of the arms of the spider when said spider is rotated after being released, whereby successive slide holders may be temporarily arrested between the lenses.

In witness whereof I hereunto set my signature.

EARL L. GILMORE.

Copies of this patent may be obtained for five cents each, by addressing the "Commissioner of Patents, Washington, D. C."